(12) United States Patent
Tulley

(10) Patent No.: US 11,102,976 B2
(45) Date of Patent: *Aug. 31, 2021

(54) PROTEIN-BASED FILM COATINGS AND USES THEREOF

(71) Applicant: 3 Star Ag LLC, Calamus, IA (US)

(72) Inventor: Brian A. Tulley, Calamus, IA (US)

(73) Assignee: 3 Star Ag LLC, Calamus, IA (US)

( * ) Notice: Subject to any disclaimer, the term of this patent is extended or adjusted under 35 U.S.C. 154(b) by 164 days.

This patent is subject to a terminal disclaimer.

(21) Appl. No.: 16/176,405

(22) Filed: Oct. 31, 2018

(65) Prior Publication Data

US 2019/0124916 A1    May 2, 2019

Related U.S. Application Data

(60) Provisional application No. 62/580,098, filed on Nov. 1, 2017.

(51) Int. Cl.
*A01N 25/10* (2006.01)
*A01N 25/00* (2006.01)

(52) U.S. Cl.
CPC ............. *A01N 25/10* (2013.01); *A01N 25/00* (2013.01)

(58) Field of Classification Search
CPC ........ A01N 25/00; A01N 25/10; A01N 25/26; A01N 65/20
See application file for complete search history.

(56) References Cited

U.S. PATENT DOCUMENTS

| | | | | |
|---|---|---|---|---|
| 3,268,335 | A * | 8/1966 | Circle | A23G 3/346 |
| | | | | 426/634 |
| 4,608,203 | A | 8/1986 | Akasaka | |
| 8,551,913 | B2 * | 10/2013 | Pearce | A01C 1/06 |
| | | | | 504/100 |
| 2002/0032233 | A1 | 3/2002 | Saebo | |
| 2005/0256001 | A1 | 11/2005 | Smith | |
| 2010/0285962 | A1 | 11/2010 | Hoffmann | |
| 2012/0135125 | A1 | 5/2012 | Muschiolik | |
| 2012/0220454 | A1 | 8/2012 | Chen | |
| 2014/0087942 | A1 | 3/2014 | Trias | |
| 2014/0100111 | A1 | 4/2014 | Schultz | |
| 2015/0072857 | A1 | 3/2015 | Reichert | |
| 2015/0299057 | A1 | 10/2015 | Scheerder | |
| 2016/0007590 | A1 | 1/2016 | Schultz | |
| 2017/0127670 | A1 | 5/2017 | Bueno | |

FOREIGN PATENT DOCUMENTS

| | | |
|---|---|---|
| CA | 2861526 | 10/2013 |
| CN | 104705230 A | 6/2015 |
| WO | 2013/150261 | 10/2013 |
| WO | 2018/151884 | 8/2018 |

OTHER PUBLICATIONS

Assis et al. "Protein hydrophobic dressing on seeds aiming at the delay of undesirable germination," Sci. Agric. (Piracicaba, Braz.), 2009, 66(1):123-126.

International Search Report and Written Opinion dated May 15, 2018 from related international application No. PCT/US2018/013805, 8 pp.

Corti et al., Biodegradation of Poly(vinyl alcohol) in Soil Environment: Influence of Natural Organic Filler and Structural Parameters, Macromol. Chem Phys., 2002, vol. 203, pp. 1526-1531.

Masoume Amirkhani, Anil N. Netravali, Wencheng Huang, and Alan G. Taylor, "Investigation of Soy Protein—based Biostimulant Seed Coating for Broccoli Seedling and Plant Growth Enhancement", HortScience Sep. 2016 51:1121-1126.

Office Action dated Jan. 8, 2019 in related U.S. Appl. No. 15/872,339, 6 pp.

Office Action dated Jun. 25, 2019 in related U.S. Appl. No. 15/872,339, 9 pp.

Costa et al. Use of untrafiltration and supercritical fluid extraction to obtain a whey buttermilk powder enriched in milk fat globule membrane phospholipids, International Dairy Journal, 2010, vol. 20, No. 9, pp. 598-602.

Su et al., The nutritional value of fish protein concentrate, Nutrition Reports International, 1982, vol. 25, No. 3, pp. 567-572.

Sathivel et al, Pyhsical and nutritional properties of catfish roe spray dried protein powder and its application in an emulsion system, Journal of Food Engineering, 2009, vol. 95, No. 1, pp. 76-81.

Niki et al, The process of producing active fish protein powder, Bulletin of the Japanese Society of Scientific Fisheries, 1982, vol. 48, No. 7, pp. 999-1004.

\* cited by examiner

*Primary Examiner* — Mina Haghighatian
*Assistant Examiner* — Nathan W Schlientz
(74) *Attorney, Agent, or Firm* — Polsinelli PC

(57) ABSTRACT

Film coatings comprising protein and lipid, and methods of using the film coatings to coat biological surfaces. For example, when applied to the surface of plant seeds, the film coating adheres to and reinforces the outer seed coat or hull to maintain seed viability.

9 Claims, 3 Drawing Sheets
(3 of 3 Drawing Sheet(s) Filed in Color)

PROTEIN-BASED FILM COATINGS AND USES THEREOF

CROSS-REFERENCE TO RELATED APPLICATIONS

This application claims the benefit of U.S. Provisional Application No. 62/580,098, filed Nov. 1, 2017, which is hereby incorporated by reference in its entirety.

BACKGROUND

Plant seeds are often treated to provide useful substances to the seeds and the seedlings upon germination. For example, seeds can be treated with plant nutrients, growth stimulating agents, and/or agents that control disease organisms or other pests. Typical the treatment comprises applying one or more coatings comprising the useful substances in combination with film-forming polymers, many of which are petroleum-based. When such treated seeds are handled or agitated, the coating can be abraded, thereby generating fine particulate matter or dust comprising the treatment materials. This dust can be harmful to humans and other animals (e.g., pollinator insects). Moreover, seed germination can be affected upon over application of petroleum-based coating materials. Thus, there is a need for improved film forming coating materials that not only have increased adherence and toughness, but also are completely biodegradable and renewable.

SUMMARY

Among the various aspects of the present disclosure is a film coating for use as a plant seed coating, wherein the film coating comprises a protein and a lipid, and the film coating adheres to and reinforces the plant seed's outer seed coat or hull to maintain viability.

Another aspect of the present disclosure encompasses a film coating comprising a soy protein and a soy lecithin.

A further aspect of the present disclose provides a plant seed comprising a film coating, the film coating comprising a soy protein and a soy lecithin.

Still another aspect of the present disclose is a method for preparing a film coated biological surface, wherein the method comprises (a) contacting a biological surface with a film coating solution, the film coating solution comprising a protein, a lipid, and a solvent; and (b) drying the biological surface after step (a) to remove the solvent, thereby forming the film coated biological surface.

Other aspects and iterations of the present disclosure are detailed below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
FIG. 1 presents a photograph of one of the test plots. Control plants are on the left and plants derived from seeds coated with a soy-based film coating are on the right.

The present disclosure provides film coatings comprising a protein and a lipid. The film coatings can be used to coat plant seeds, wherein the film coating adheres to and reinforces the outer seed coat or hull of the plant seed, thereby maintaining seed viability. Moreover, repeated applications of the protein-based film coating does not affect seed germination. Additionally, the protein-based film coatings are strong and durable, thereby reducing formation of plant seed dust and improving seed flowability. Advantageously, the nitrogen in the protein-based film coatings provide positive benefits by improving plant growth and yield. Also provided herein are methods of using the protein-based film coatings to coat the surface of plants seed and other biological surfaces.

(I) Protein-Based Film Coatings

One aspect of the present disclosure provides a film coating for plant seeds or other biological surfaces, wherein the film coating comprises a protein and a lipid. The film coating adheres to the biological surface and forms a thin, uniform, continuous, protective coating over the entire surface. The protein-based film coating is water soluble and biodegradable.

In embodiments in which the film coating is applied to a plant seed, the film coating adheres to and reinforces the outer seed coat or hull of the plant seed, thereby and preventing cracking or chipping of the seed hull and maintaining seed viability. The protein-based film coating does not affect seed germination and improves plant seedling vigor (i.e., seedling size, health, and growth rate). Additionally, the protein-based film coating reduces seed-to-seed friction, improves plant seed flowability during planting, and reduces formation of seed dust or rub-off.

(a) Components of the Film Coating

The film coatings disclosed herein comprise at least one protein and at least one lipid. In some embodiments, the film coatings may further comprise at least one colorant or dye. In additional embodiments, the film coating may further comprise at least one active ingredient, wherein the active ingredient may be a micronutrient, a fertilizer, a *rhizobium* inoculum, a plant growth regulator, a fungicide, an insecticide, a herbicide, or a combination thereof.

(i) Protein

The film coatings disclosed herein comprises at least one protein. A variety of proteins are suitable for use in the film coating. In general, the protein may be or may be derived from a plant protein, an animal protein, a fungal protein, a bacterial protein, or a combination thereof. The protein may be a protein concentrate or a protein isolate.

In some embodiments, the protein may be a plant protein. Non-limiting examples of suitable plant proteins include soy protein, corn protein, oat protein, wheat protein, pea protein, rice protein, nut protein, algal (e.g., *Spirulina*) protein, or kelp protein. In other embodiments, the protein may be an animal protein. Examples of suitable animal proteins include, without limit, whey protein, casein protein, egg protein, albumen protein, blood meal protein, bone meal protein, fish protein, shellfish protein, or plankton protein. In yet other embodiments, the protein may be a fungal protein chosen from brewer's yeast protein (i.e., *Saccharomyces cerevisiae*) or a probiotic yeast protein (e.g., *Saccharomyces cerevisiae, Saccharomyces boulardii*, or *Kluyveromyces lactis*). In additional embodiments, the protein may be a bacterial protein. For example, the bacterial protein may be derived from probiotic bacteria such as *Lactobacillus, Bifidobacterium*, or *Bacillus*.

In specific embodiments, the protein may be soy protein. For example, the soy protein may be a soy protein concentrate. Alternatively, the soy protein may be a soy protein isolate. Soy protein concentrates are made by repeatedly washing defatted soybean flakes with water, which may optionally contain low levels of food grade alcohols or buffers. The effluent from the repeated washings is discarded, and the solid residue is dried, producing the desired concentrate. Soy protein isolates are typically made by extracting defatted soy flakes or soy flour under alkaline conditions (pH 7-12). The extract is adjusted to pH 4.5 with acids such as sulfuric, hydrochloric, phosphoric or acetic acid. At a pH of 4.5 (the approximate isoelectric point), soy proteins precipitate and may readily be separated mechanically. The protein precipitate is subsequently processed thermally/chemically or both. The pH of both soy protein concentrates or soy protein isolates may be adjusted to reach a target value prior drying to produce the final product. The soy protein concentrate or soy protein isolate may further comprise from about 6% to about 15% of ash on a dry weight basis.

The amount of protein present in the film coating can and will vary depending upon the type of protein in the film coating and the desired functional properties of the film coating. In general, the amount of protein in the film coating may range from about 70% to about 99.9% by weight of the film coating. In various embodiments, the amount of protein in the film coating may range from about 70% to about 74%, from about 75% to about 79%, from about 80% to about 84%, from about 85% to about 89%, from about 90% to about 94%, or from about 95% to about 99.9% by weight of the film coating. In embodiments in which the protein is soy protein, the film coating may comprise at least about 80% protein, at least about 85% protein, at least about 90% protein, or at least about 95% of soy protein by weight of the film coating. In embodiments in which the protein is soy protein isolate, the amount of soy protein in the film coating may be at least 90%, at least 92%, at least 94%, at least 96%, at least 97%, at least 98%, or at least 99% by weight of the film coating. In specific embodiments, the film coating may comprise from about 95% to about 99.9% of soy protein by weight of the film coating.

(ii) Lipid

The film coatings also comprises at least one lipid. In some embodiments, the lipid may be a phospholipid such as a lecithin. The lecithin may be derived from soy, sunflower, corn, peanuts, grains, or eggs. In other embodiments, the lipid may be an oil or a fat. Suitable oils include vegetable oils, such as, for example, include soy oil, coconut oil, corn oil, cottonseed oil, palm oil, peanut oil, rapeseed oil, safflower oil, or sunflower oil, or fish oils, such as, for example, anchovy oil, herring oil, krill oil, mackerel oil, salmon oil, or sardine oil. Suitable fats include animals fats such as beef tallow, pork fat, lamb fat, chicken fat, butter fat, and the like.

In specific embodiments, the lipid may be soy lecithin.

The amount of lipid in the film coating can and will vary depending upon the type of lipid in the film coating and the desired functional properties of the film coating. In general, the film coating comprises from about 0.005% to about 5% of lipid by weight of the film coating. In various embodiments, the amount of lipid in the film coating may range from about 0.005% to about 0.05%, from about 0.05% to about 0.5%, from about 0.5% to about 1%, or from about 1% to about 5% by weight of the film coating. In embodiments in which the lipid is soy lecithin, the film coating may comprise from about 0.01% to about 5% of soy lecithin.

(iii) Colorant or Dye

In some embodiments in which the film coating is a plant seed film coating, the film coating may also comprise at least one colorant or dye. In general, the colorant or dye is approved by the EPA for use in seed treatment material. Suitable colorants and dyes include Basic Violet #10, Acid Yellow #23, Basic Violet #1, Acid Blue #9, Acid Red #33, Solvent Red #23, Solvent Violet #13, Solvent Green #3, Basic Blue #9, Pigment Red 48.2, and Pigment Red 40.

The amount of colorant or dye included in the plant seed film coating may vary and can be readily determined by those of ordinary skill in the art.

(iv) Optional Active Ingredients

The film coating may also comprise one or more active ingredients. Suitable active ingredients include micronutrients, fertilizers, *rhizobium* inoculums, plant growth regulators, fungicides, insecticides, herbicides, preservatives, or combinations thereof.

In some embodiments, the one or more active ingredients in the film coating may be a micronutrient. Soil micronutrients include boron, chlorine, copper, iron, manganese, molybdenum, and zinc. Other micronutrients include cobalt, silicon, and vanadium.

In other embodiments, the one or more active ingredients may be a fertilizer. Suitable fertilizers include, without limit, nitrogen (N) fertilizers, phosphate (P) fertilizers, potassium (K) fertilizers, NP fertilizers, NK fertilizers, PK fertilizers, and NPK fertilizers. In certain embodiments, the fertilizer may contain one or more secondary macronutrients such as calcium, magnesium, and/or sulfur. For example, suitable fertilizers include mono- or dibasic ammonium phosphates, their calcium and magnesium salts, ammonium nitrates, and mixtures thereof. In other embodiments, the fertilizer may also contain one or more micronutrients. In further embodiments, the fertilizer may be synthetic or commercial. In other embodiments, the fertilizer may be organic and contain plant and/or animal derived organic matter. In certain embodiments, the fertilizer may provide slow or controlled release of the nutrients.

In further embodiments, the one or more active ingredients may be a plant growth regulator. Plant growth regulators are natural or synthetic substances that influence plant growth and development. Non-limiting examples of plant growth regulators include auxins (e.g., indole acetic acid, indole propionic acid, indole butyric acid, naphthalene acetic acid, and the like), gibberellins (e.g., gibberellin A1 (GA1), gibberellic acid (GA3), GA4, GA7, ent-gibberellane, ent-kaurene, and so forth), cytokinins (e.g., kinetin, zeatin, 6-benzylaminopurine, diphenylurea, thidiazuron, and the like), abscisic acid, and ethylene.

In still other embodiments, the one or more active ingredients may be a *rhizobium* inoculum. Non-limiting examples of agriculturally relevant rhizobia include *Rhizobium leguminosarum, Rhizobium loti, Rhizobium meliloti, Rhizobium trifolii, Bradyrhizobium japonicum*, and *Mesorhizobium ciceri*.

In additional embodiments, the one or more active ingredients may be a fungicide. Suitable fungicides include, without limit, carbamate fungicides such as 3,3'-ethylenebis (tetrahydro-4,6-dimethyl-2H-1,3,5-thiadiazine-2-thione), zinc or manganese ethylenebis(dithiocarbamate), bis(dimethyldithiocarbamoyl)disulfide, zinc propylenebis(dithiocarbamate, bis(dimethyldithiocarbamoyl)ethylenediamine, nickel dimethyldithiocarbamate, methyl 1-(butylcarbamoyl)-2-benzimidazolecarbamate, 1,2-bis(3-methoxycarbonyl-2-thioureido)benzene, 1-isopropylcarbamoyl-3-(3,5-dichlorophenyl)hydantoin, potassium N-hydroxymethyl-N-methyldithiocarbamate, and 5-methyl-10-butoxycarbonylamino-10,11-dehydrodibenzo (b,f)azepine; pyridine fungicides such as zinc bis(1-hydroxy-2(1H)pyridinethionate) and 2-pyridinethiol-1-oxide sodium salt; phosphorus fungicides such as O,O-diisopropyl S-benzylphosphorothioate and O-ethyl S,S-diphenyldithiophosphate; phthalimide fungicides such as N-(2,6-diethylphenyl) phthalimide and N-(2,6-diethylphenyl)-4-methylphthalimide; dicarboxyimide fungicides such as N-trichloromethylthio-4-cyclohexene-1,2-dicarboxyimide and N-tetrachloroethylthio-4-cyclohexene-1,2-dicarboxyimide; oxathine fungicides such as 5,6-dihydro-2-methyl-1,4-oxathine-3-carboxanilido-4,4-dioxide and 5,6-dihydro-2-methyl-1,4-oxathine-3-carboxanilide; naphthoquinone fungicides such as 2,3-dichloro-1,4-naphthoquinone, 2-oxy-3-chloro-1,4-naphthoquinone copper sulfate; pentachloronitrobenzene; 1,4-dichloro-2,5-dimethoxybenzene; 5-methyl-s-triazol(3,4-b)benzthiazole; 2-(thiocyanomethylthio)benzothiazole; 3-hydroxy-5-methylisooxazole; N-2,3-dichlorophenyltetrachlorophthalamic acid; 5-ethoxy-3-trichloromethyl-1-2,4-thiadiazole; 2,4-dichloro-6-(O-chloroanilino)-1,3,5-triazine; 2,3-dicyano-1,4-dithioanthraquinone; copper 8-quinolinate, polyoxine; validamycin; cycloheximide; iron methanearsonate; diisopropyl-1,3-dithiolane-2-iridene malonate; 3-allyloxy-1,2-benzoisothiazol-1,1-dioxide; kasugamycin; blasticidin S; 4,5,6,7-tetrachlorophthalide; 3-(3,5-dichlorophenyl)-5-ethenyl-5-methyloxazolizine-2,4-dione; N-(3,5-dichlorophenyl)-1,2-dimethylcyclopropane-1,2-dicarboxyimide; S-n-butyl-5'-para-t-butylbenzyl-N-3-pyridyldithiocarbonylimidate; 4-chlorophenoxy-3,3-dimethyl-1-(1H,1,3,4-triazol-1-yl)-2-butanone; methyl-D,L-N-(2,6-dimethylphenyl)-N-(2'-methoxyacetyl)alaninate; N-propyl-N-[2-(2,4,6-trichlorophenoxy)ethyl]imidazol-1-carboxamide; N-(3,5-dichlorophenyl)succinimide; tetrachloroisophthalonitrile; 2-dimethylamino-4-methyl-5-n-butyl-6-hydroxypyrimidine; 2,6-dichloro-4-nitroaniline; 3-methyl-4-chlorobenzthiazol-2-one; 1,2,5,6-tetrahydro-4H-pyrrolo[3,2,1-i,j]quinoline-2-one; 3'-isopropoxy-2-methylbenzanilide; 1-[2-(2,4-dichlorophenyl)-4-ethyl-1,3-dioxorane-2-ylmethyl]-1H,1,2,4-triazol; 1,2-benzisothiazoline-3-one; basic copper chloride; basic copper sulfate; N'-dichlorofluoromethylthio-N,N-dimethyl-N-phenylsulfamide; ethyl-N-(3-dimethylaminopropyl)thiocarbamate hydrochloride; piomycin; S,S-6-methylquinoxaline-2,3-diyldithiocarbonate; complex of zinc and manneb; di-zinc bis(dimethyldithiocarbamate) ethylenebis (dithiocarbamate) and glyphosate; chlorothalonil-based fungicides, strobilurin-based fungicides such as azoxystrobin, pyraclostrobin, and trifloxystrobin; and triazole-based fungicide such as myclobutanil, propiconazole, tebuconazol, and tetraconazole. In some embodiments, the fungicide may be zeolite. In further embodiments, the fungicide may be captan, carboxin, difenoconazole, fludioxonil, imazalil, mefenoxam, metalaxyl, pentachloronitrobenzene, penhlufen, prothioconazole, sedaxane, tebuconazole, thiabendazole, thiram, or triadimenol.

In additional embodiments, the one or more active ingredient may be an insecticide. In some embodiments, the insecticide may be a neonicotinoid. Non-limiting examples of suitable neonicotinoids include abamectin, acetamiprid, clothianidin, dinotefuran, imidacloprid, nitenpyram, nithiazine, thiacloprid, and thiamethoxam. In other embodiments, the insecticide may be an organophosphate. Suitable organophosphates include O,O-diethyl O-(2-isopropyl-4-methyl-6-pyrimidinyl)phosphorothioate, O,O-dimethyl S-2-[(ethylthio)ethyl]phosphorodithioate, O,O-dimethyl O-(3-methyl-4-nitrophenyl)thiophosphate, O,O-dimethyl S—(N-methylcarbamoylmethyl)phosphorodithioate, O,O-dimethyl S—(N-methyl-N-formylcarbamoylmethyl) phosphorodithioate, O,O-dimethyl S-2-[(ethylthio)ethyl] phosphorodithioate, O,O-diethyl S-2-[(ethylthio)ethyl] phosphorodithioate, O,O-dimethyl-1-hydroxy-2,2,2-trichloroethylphosphonate, O,O-diethyl-O-(5-phenyl-3-isooxazolyl)phosphorothioate, O,O-dimethyl O-(2,5-dichloro-4-bromophenyl)phosphorothioate, O,O-dimethyl O-(3-methyl-4-methylmercaptophenyl)thiophosphate, O-ethyl O-p-cyanophenyl phenylphosphorothioate, O,O-dimethyl-S-(1,2-dicarboethoxyethyl) phosphorodithioate, 2-chloro-(2,4,5-trichlorophenyl) vinyldimethyl phosphate, 2-chloro-1-(2,4-dichlorophenyl) vinyldimethyl phosphate, O,O-dimethyl O-p-cyanophenyl phosphorothioate, 2,2-dichlorovinyl dimethyl phosphate, O,O-diethyl O-2,4-dichlorophenyl phosphorothioate, ethyl mercaptophenylacetate O,O-dimethyl phosphorodithioate, S-[(6-chloro-2-oxo-3-benzooxazolinyl)methyl] O,O-diethyl phosphorodithioate, 2-chloro-1-(2,4-dichlorophenyl)vinyl diethylphosphate, O,O-diethyl O-(3-oxo-2-phenyl-2H-pyridazine-6-yl) phosphorothioate, O,O-dimethyl S-(1-methyl-2-ethylsulfinyl)-ethyl phosphorothiolate, O,O-dimethyl S-phthalimidomethyl phosphorodithioate, O,O-diethyl S—(N-ethoxycarbonyl-N-methylcarbamoylmethyl)phosphorodithioate, O,O-dimethyl S-[2-methoxy-1,3,4-thiadiazol-5-(4H)-onyl-(4)-methyl] dithiophosphate, 2-methoxy-4H-1,3,2-benzooxaphosphorine 2-sulfide, O,O-diethyl O-(3, 5,6-trichloro-2-pyridyl)phosphorothiate, O-ethyl O-2,4-dichlorophenyl thionobenzene phosphonate, 5-[4,6-diamino-s-triazine-2-yl-methyl] O,O-dimethyl phosphorodithioate, O-ethyl O-p-nitrophenyl phenyl phosphorothioate, O,S-dimethyl N-acetyl phosphoroamidothioate, 2-diethylamino-6-methylpyrimidine-4-yl-diethylphosphorothionate, 2-diethylamino-6-methylpyrimidine-4-yl-dimethylphosphorothionate, O,O-diethyl O—N-(methylsulfinyl) phenyl phosphorothioate, O-ethyl S-propyl O-2,4-dichlorophenyl phosphorodithioate, and cis-3-(dimethoxyphosphinoxy)N-methyl-cis-crotone amide. In additional embodiments, the insecticide may be a carbamate. Non-limiting examples of suitable carbamates include 1-naphthyl N-methylcarbamate, S-methyl N-[methylcarbamoyloxy]thioacetoimidate, m-tolyl methylcarbamate, 3,4-xylyl methylcarbamate, 3,5-xylyl methylcarbamate, 2-sec-butylphenyl N-methylcarbamate, 2,3-dihydro-2,2-dimethyl-7-benzofuranylmethylcarbamate, 2-isopropoxyphenyl N-methylcarbamate, 1,3-bis(carbamoylthio)-2-(N,N-dimethylamino)propane hydrochloride, and 2-diethylamino-6-methylpyrimidine-4-yl-dimethylcarbamate. In still other embodiments, the insecticide may be chosen from N,N-dimethyl N'-(2-methyl-4-chlorophenyl)formamidine hydrochloride, nicotine sulfate, milbemycin, 6-methyl-2,3-quinoxalinedithiocyclic S,S-dithiocarbonate, 2,4-dinitro-6-sec-butylphenyl dimethylacrylate, 1,1-bis(p-chlorophenyl) 2,2, 2-trichloroethanol, 2-(p-tert-butylphenoxy)isopropyl-2'-chloroethylsulfite, azoxybenzene, di-(p-chlorophenyl)-cyclopropyl carbinol, di[tri(2,2-dimethyl-2-phenylethyl)tin] oxide, 1-(4-chlorophenyl)-3-(2,6-difluorobenzoyl) urea, and S-tricyclohexyltin O,O-diisopropylphosphorodithioate. In certain embodiments, the insecticide may be chlorpyriphos, diazinon, imidacloprid, lindane, permethrin, tefluthrin, or thiamethoxam.

In yet other embodiments, the one or more active ingredients may be a herbicide. Non-limiting examples of suitable herbicides include imidazolinone, acetochlor, acifluorfen, aclonifen, acrolein, AKH-7088, alachlor, alloxydim, ametryn, amidosulfuron, amitrole, ammonium sulfamate, anilofos, asulam, atrazine, azafenidin, azimsulfuron, BAS 620H, BAS 654 00H, BAY FOE 5043, benazolin, benfluralin, benfuresate, bensulfuron-methyl, bensulide, bentazone, benzofenap, bifenox, bilanafos, bispyribac-sodium, bromacil, bromobutide, bromofenoxim, bromoxynil, butachlor, butamifos, butralin, butroxydim, butylate, cafenstrole, carbetamide, carfentrazone-ethyl, chlormethoxyfen, chloramben, chlorbromuron, chloridazon, chlorimuron-ethyl, chloroacetic acid, chlorotoluron, chlorpropham, chlorsulfuron, chlorthal-dimethyl, chlorthiamid, cinmethylin, cinosulfuron, clethodim, clodinafop-propargyl, clomazone, clomeprop, clopyralid, cloransulam-methyl, cyanazine, cycloate, cyclosulfamuron, cycloxydim, cyhalofop-butyl, 2,4-dichlorophenoxyacetic acid, daimuron, dalapon, dazomet, 4-(2,4-dichlorophenoxy)butanoic acid, desmedipham, desmetryn, dicamba, dichlobenil, dichlorprop, dichlorprop-P, diclofop-methyl, difenzoquat metilsulfate, diflufenican, dimefuron, dimepiperate, dimethachlor, dimethametryn, dimethenamid, dimethipin, dimethylarsinic acid, dinitramine, dinocap, dinoterb, diphenamid, diquat dibromide, dithiopyr, diuron, DNOC, EPTC, esprocarb, ethalfluralin, ethametsulfuron-methyl, ethofumesate, ethoxysulfuron, etobenzanid, fenoxaprop-P-ethyl, fenuron, ferrous sulfate, flamprop-M, flazasulfuron, fluazifop-butyl, fluazifop-P-butyl, fluchloralin, flumetsulam, flumiclorac-pentyl, flumioxazin, fluometuron, fluoroglycofen-ethyl, flupoxam, flupropanate, flupyrsulfuron-methyl-sodium, flurenol, fluridone, flurochloridone, fluroxypyr, flurtamone, fluthiacet-methyl, fomesafen, fosamine, glufosinate-ammonium, glyphosate, glyphosinate, halosulfuron-methyl, haloxyfop, HC-252, hexazinone, imazamethabenz-methyl, imazamox, imazapyr, imazaquin, imazethapyr, imazosuluron, imidazilinone, indanofan, ioxynil, isoproturon, isouron, isoxaben, isoxaflutole, lactofen, lenacil, linuron, MCPA, MCPA-thioethyl, MCPB, mecoprop, mecoprop-P, mefenacet, metamitron, metazachlor, methabenzthiazuron, methylarsonic acid, methyldymron, methyl isothiocyanate, metobenzuron, metobromuron, metolachlor, metosulam, metoxuron, metribuzin, metsulfuron-methyl, molinate, monolinuron, naproanilide, napropamide, naptalam, neburon, nicosulfuron, nonanoic acid, norflurazon, oleic acid (fatty acids), orbencarb, oryzalin, oxadiargyl, oxadiazon, oxasulfuron, oxyfluorfen, paraquat dichloride, pebulate, pendimethalin, pentachlorophenol, pentanochlor, pentoxazone, petroleum oils, phenmedipham, picloram, piperophos, pretilachlor, primisulfuron-methyl, prodiamine, prometon, prometryn, propachlor, propanil, propaquizafop, propazine, propham, propisochlor, propyzamide, prosulfocarb, prosulfuron, pyraflufen-ethyl, pyrazolynate, pyrazosulfuron-ethyl, pyrazoxyfen, pyributicarb, pyridate, pyriminobac-methyl, pyrithiobac-sodium, quinclorac, quinmerac, quinoclamine, quizalofop, quizalofop-P, rimsulfuron, sethoxydim, siduron, simazine, simetryn, sodium chlorate, STS system (sulfonylurea), sulcotrione, sulfentrazone, sulfometuron-methyl, sulfosulfuron, sulfuric acid, tar oils, 2,3,6-TBA, TCA-sodium, tebutam, tebuthiuron, terbacil, terbumeton, terbuthylazine, terbutryn, thenylchlor, thiazopyr, thifensulfuron-methyl, thiobencarb, tiocarbazil, tralkoxydim, tri-allate, triasulfuron, triaziflam, tribenuron-methyl, triclopyr, trietazine, trifluralin, triflusulfuron-methyl, and vernolate.

In additional embodiments, the one or more active ingredients may be a preservative. Non limiting examples of suitable preservatives include antioxidants (such as, e.g., alpha-tocopherol, ascorbyl palmitate, butylated hydroxyanisole, butylated hydroxytoluene, citric acid, dihydroguaretic acid, potassium ascorbate, potassium sorbate, propylgallate, sodium bisulfate, sodium isoascorbate, sodium metabisulfate, sorbic acid, 4-chloro-2,6-ditertiarybutylphenol, and so forth), antimicrobials (such as, e.g., benzyl alcohol, cetylpryidine chloride, glycerine, parabens, propylene glycol, potassium sorbate, sodium benzoate, sorbic acid, sodium propionate, and the like), or combinations thereof.

The amount of the one or more active ingredients included in the film coating can and will vary depending upon the identity of the active ingredient. Those of skill in the art can readily determine the effective amount of the one or more active ingredients included in the film coating.

(v) Optional Inert Ingredients

In some embodiments, the film coating may further comprise one or more inert ingredients. For example, in some aspects, the film coating may further comprise a polyalcohol such as glycerol, sorbitol, mannitol, xylitol, or a low molecular weight polyethylene glycol, or a saccharide such as sucrose, maltose, lactose, trehalose, or cellobiose. In other aspects, the film coating may further comprise a surfactant or wetting agent, which may be anionic, cationic, nonionic, or zwitterionic. Non-limiting examples of surfactants or wetting agents include sulphonates, alkyl sulfates, alkylphenols, ethoxylated aliphatic alcohols, polyoxyethylenes, carboxylic esters, polyethylene glycol esters, fatty acid glycerol esters, quaternary ammonium salts, and so forth. In yet additional aspects, the film coating may further comprise a pH modifying agent such as an inorganic or organic acid and/or an inorganic or organic base.

(vi) Exemplary Film Coatings

In certain embodiments, the film coating comprises a soy protein isolate and a soy lecithin. In other embodiments, the film coating consists of or consists essentially of a soy protein isolate, a soy lecithin, and a colorant or dye. In further embodiments, the film coating comprises at least 95%, at least 96%, at least 97%, at least 98%, or at least 99% of the soy protein isolate and less than 5%, less than 4%, less than 3%, less than 2%, or less than 1% of the soy lecithin. In specific embodiments, the film coating comprises >99% soy protein isolate and <1% of soy lecithin by weight.

(b) Properties of the Film Coating

The protein-based film coatings disclosed herein have excellent film forming properties, i.e., they are capable of forming a film over a solid surface. The film coating adheres to the surface and forms a thin, uniform, continuous, protective coating on the surface. In some embodiments, the film coating further comprises one or more active ingredients that are uniformly dispersed throughout the film coating.

The film coatings disclosed herein are biodegradable, meaning that they can be readily decomposed by the action of bacteria or other living organisms. For example, a film coating comprising soy protein and soy lecithin is totally decomposed in 28 days (as determined using a Sturm test). In contrast, film coatings comprising synthetic or petroleum-based polymers (such as, e.g., polyvinyl alcohol) are still present in the soil after 179 days (Corti et al., Macromolecular Chemistry and Physics, 2002, 203(10-11):1526-1531).

Additionally, the film coatings disclosed herein adhere to a biological surface, thereby protecting the surface and/or maintaining active ingredients in contact with the biological surface.

(II) Film-Coated Plant Seeds

Another aspect of the present disclosure encompasses a plant seed or a plurality of plant seeds comprising a film coating, wherein the film coating comprises a protein and a lipid.

(a) Film Coating

Suitable film coatings are described above in section (I). In some embodiments, the film-coated plant seed may comprise one film coating. In other embodiments, the film-coated plant seed may comprise multiple film coatings, e.g., two, three, four, five, six, seven, eight, nine, or ten discrete film coatings. In further embodiments, the film-coated plant seed may comprise more than ten discrete film coatings.

In general, the film coating(s) is present at a level of about 1% to about 10% by weight of the plant seed. In various embodiments, the amount of the film coating(s) may be about 1%, about 2%, about 3%, about 4%, about 5%, about 6%, about 7%, about 8%, about 9%, or about 10% by weight of the plant seed.

The film coating adheres to and reinforces the outer seed coat or hull of the plant seed, thereby protecting the plant seed. In particular, the adhesive film coating prevents cracking or chipping of the seed hull and maintains seed viability. Additionally, the film coating prevents or minimizes formation of seed dust (i.e., the naturally occurring components of the seed such as chaff or outer hull or husk). Moreover, when the plant-based film coating is applied to a treated seed (i.e., a seed treated or coated with one or more active ingredients, such a fungicide and/or pesticide), the film coating prevents formation treated seed dust, which is the fine particulate matter contained in or easily dislodged from treated seeds. The film coatings also reduce seed-to-seed friction, improve plant seed flowability during planting, and exhibit little or no rub off (which refers to the tendency of colorants and dyes to be transferred from the seeds to the operator or the operator's machinery).

The film coatings are water soluble and are able to readily dissolve upon contact with moisture in the soil after seed planting. As such, the film coatings do not affect seed germination, even after application of multiple layers of the protein-based film coatings. Moreover, the nitrogen in the protein-based film coating also provides benefits, e.g., increased emergence, improved plant seedling vigor (i.e., seedling size, health, and growth rate), and improved yield (see Example 2).

(b) Plant Seeds

In some embodiments, the plant seed may be an untreated seed, i.e., a seed that has not been treated using any chemical, biological, or physical method. The protein-based film coating may be devoid of any active ingredients such that it functions as a protective top coating to the seed. Alternatively, the film coating may comprise one or more active ingredients such that it functions as a seed treatment coating.

In other embodiments the plant seed may be a treated seed, i.e., a seed that has been treated or coated with one or more active ingredients, wherein the one or more active ingredients may be a micronutrient, a fertilizer, a *rhizobium* inoculum, a plant growth regulator, a fungicide, an insecticide, a herbicide, or a combination thereof. The seed treatment or coating may further comprise inert ingredients and/or polymers in combination with the active ingredient(s). Examples of suitable inert ingredient include fillers, binders, and/or lubricants, which are well known in the art. The polymer may be a cellulose derived polymer such as methyl cellulose, ethyl cellulose, hydroxypropylmethyl cellulose, hydroxypropyl cellulose, or hydroxypropylethyl cellulose, or a petroleum-based polymer such as polyvinyl alcohol (also known as PVOH), polyacrylic acids, polymethacrylic acids, polyacrylates, polymethacrylates, polyvinyls, polyvinyl acetates, polyurethanes, polyurethane acrylics, polyesters, polyethylene oxides, polypropylene oxides, and copolymers of any of the foregoing. The protein-based film coating may be devoid of any active ingredients such that it functions as a protective top coating to the treated seed. Alternatively, the protein-based film coating may comprise one or more active ingredients such that it functions as a seed treatment coating over the existing treatments or coatings.

Any of the above-mentioned protein-based film coatings may further comprise a colorant or dye.

(i) Types of Plant Seeds

In some embodiments, the treated or untreated plant seeds may be corn or maize seeds. Corn or maize seeds refers to any seed from a *Zea mays* plant that is used for food-related production or other industrial purpose such as starch production, bio-fuel manufacture (e.g., ethanol manufacture), animal fodder production and the like. Examples of *Zea mays* varieties used in industry include flour corn (*Zea mays* var. *Amylacea*), popcorn used as a food and in packaging materials (*Zea mays* var. *Evert*), flint corn used for hominy production (*Zea mays* var. *Indurata*), sweet corn used as a food (*Zea mays* var. *saccharata* and *Zea mays* var. *Rugosa*), waxy corn used in producing food thickening agents, in the preparation of certain frozen foods, and in the adhesive industry (*Zea mays* var. *Ceratina*), Amylomaize maiz used in the production of biodegradeable plastics (*Zea mays*), striped maize used as an ornamental (*Zea mays* var. *Japonica*), blue corn (*Zea mays* var. *amylacea*), silver queen corn, golden bantam, early sunglow, Indian corn, sugar corn, pole corn, field corn, dent corn, flint corn, and flour corn.

In other embodiments, the treated or untreated plant seeds may be legume plant seeds or the seeds of leguminous plants. Examples of legume plant seeds include seeds of legume species of the family Fabaceae that includes species such as alfalfa (*Medicago sativa*), Austrian winter pea (*Pisum sativum*), berseem clover (*Trifolium alexandrinum*), black medic (*Medicago lupulina*), chickling vetch/pea (*Lathyrus sativus*), cowpea (*Vigna unguiculata*), crimson clover (*Trifolium incamatum*), field peas (*Pisum sativum* subsp. *arvense*), hairy vetch (*Vicia villosa*), horse beans (*Vicia faba*), kura clover (*Trifolium ambiguum*), mung bean (*Vigna radiate*), red clover (*Trifolium pratense*), soy beans (*Glycine max*), subterranean clover (*Trifolium subterraneum*), sunn hemp (*Crotalaria juncea* L), white clover (*Trifolium repens*), white sweet clover (*Melilotus alba*), woolypod vetch (*Vicia vfflosa* ssp. *dasycarpa*), yellow sweet clover (*Melilotus officinalis*), adzuki bean, (*Vigna angularis*, syn.: *Phaseolus angularis*), broad bean (*V. faba* var. major), field bean (*Vicia faba*), vetch (*Vicia sativa*), common beans (*Phaseolus vulgaris*), including green beans, runner beans, haricot beans and the like, chick pea (*Cicer arietinum*), guar bean (*Cyamopsis tetragonoloba*), hyacinth bean (*Dolichos lablab*), lentil (*Lens culinaris*), lima bean (*Phase lus lunatus*), lupin (*Lupinus* spp.), pea (*Pisum sativum*), peanut (*Arachis hypogaea*), pigeon pea (*Cajanus cajan*), and tepary bean (*Phaseolus acutifolius*).

In yet other embodiments, the treated or untreated plant seeds may be cereal seeds. Cereal seeds include invention include seeds of rice (*Owe sativa*), wheat (*Triticum* spp. such as *T. aestivum*) including species such as spelt (*T. spelta*), einkorn (*T. monococcum*), emmer (*T. dicoccum*) and durum (*T. durum*), barley (*Hordeum vulgare*) including two row and six row barley, sorghum (*Sorghum bicolor*), millet species such as pearl millet (*Pennisetum glaucum*), foxtail millet (*Setaria italica*), proso millet (*Panicum miliaceum*) and finger millet (*Eleusine coracana*), oats (*Avena sativa*), rye (*Secale cereale*), triticale (x *Triticosecale*), and buckwheat (*Fagopyrum esculentum*).

In still other embodiments, the treated or untreated plant seeds may be grass seeds for lawns, pastures, forage uses, cover crops, and turf uses. Suitable grass seeds include ryegrass (e.g., annual ryegrass, perennial ryegrass, winter ryegrass, Italian ryegrass, hybrid ryegrass), bluegrass (e.g., Kentucky), and fescue (e.g., red fescue, fescue, meadow fescue, tall fescue, Lucerne fescue).

In further embodiments, the treated or untreated plant seeds may be cotton seeds (*Gossypium hirsutum*), oil seeds such as linseed, sunflower, safflower, oilseed rape, canola, mustard, sesame, poppy, castor, jojoba, dika, grape, flax, hemp, and the like.

In still additional embodiments, the treated or untreated plant seeds may be vegetable seeds, such as the seeds of cabbages, broccolis, cauliflowers, kales, Brussels sprouts, and kohlrabis; seeds of alliums including onion, leek and garlic. Other suitable plant seeds include capsicums, tomatoes, peppers, cucurbits such as cucumbers, cantaloupes, summer squashes, pumpkins, butternut squashes, tropical pumpkins, calabazas, winter squashes, watermelons, musk melons, lettuces, zucchinis, eggplants, beets, carrots, peas, beans, parsnips, rutabaga, turnips, sugar beets, potatoes, sweet potatoes, tapioca, yams, celeriacs, Jerusalem artichokes, artichokes, bok choi, celery, Chinese cabbage, horse radish, parsley, radish, spinach, carob, coriander, okra, and the like.

(III) Methods for Preparing Film Coated Biological Surfaces

Another aspect of the present disclosure provides methods for preparing film coated biological surfaces. Said methods comprise (a) contacting a biological surface with a film coating solution, wherein the film coating solution comprises a protein, a lipid, and a solvent, and (b) drying the biological surface after step (a) to remove the solvent, thereby forming the film coated biological surface. The biological surface may be a plant seed, a plant, or an animal.

(a) Forming the Film Coating Solution

The process commences with formation of the film coating solution by mixing a protein and a lipid with a solvent, along with any optional ingredients. Suitable proteins and lipids are described above in sections (I)(a)(i) and (I)(a)(ii), respectively. In general, the solvent is an aqueous solvent. Suitable aqueous solvents include water, alcohols such as methanol, ethanol, isopropanol, n-propanol, isobutanol, n-butanol, s-butanol, t-butanol, and the like, diols such as propylene glycol or ethylene glycol, and organic acids such as formic acid, acetic acid, and so forth. In specific embodiments, the aqueous solvent may be water. The water may be potable water, tap water, purified water, demineralized water, distilled water, or deionized water.

The amount of protein and lipid present in the film coating solution can and will vary depending upon the desired functional properties of the film coating. In general, the film coating solution may comprise from about 0.5% to about 30% of protein by weight of the film coating solution. In various embodiments, the amount of protein may range from about 0.5% to about 3%, from about 3% to about 10%, or from about 10% to about 30% by weight of the film coating solution. In specific embodiments, the amount of protein may range from about 1% to about 10% by weight. For example, the amount of protein in the film coating solution may be about 1%, about 2%, about 3%, about 4%, about 5%, about 6%, about 7%, about 8%, about 9%, or about 10% by weight of the film coating solution.

In general, the film coating solution may comprise from about 0.005% to about 0.3% of lipid by weight of the film coating solution. In various embodiments, the amount of lipid may range from about 0.005% to about 0.03%, from about 0.03% to about 0.1%, or from about 0.1% to about 0.3% by weight of the film coating solution. In specific embodiments, the amount of lipid may range from about 0.01% to about 0.1% by weight. For example, the amount of lipid in the film coating solution may be about 0.01%, about 0.02%, about 0.03%, about 0.04%, about 0.05%, about 0.06%, about 0.07%, about 0.08%, about 0.09%, or about 0.1% by weight of the film coating solution.

The protein and lipid are added to the solvent to form a mixture. The mixture may be mixed by stirring, blending, shaking, rotating, mixing, or other suitable mixing means. In general, the mixing proceed until a homogeneous solution is obtained. The duration of the mixing may range from about one minute to one or more hours. The mixture also may be heated to a temperature ranging from about 30° C. to about 90° C. In various embodiments, the temperature may range from about 30° C. to about 40° C., from about 40° C. to about 50° C., from about 50° C. to about 60° C., from about 60° C. to about 70° C., from about 70° C. to about 80° C., or from about 80° C. to about 90° C. In specific embodiments, the mixture may be heated to about a temperature ranging from about 40° C. to about 60° C. In some embodiments, the protein and lipid may be added to the solvent that has been preheated to the desired temperature.

The pH of the film coating solution may be adjusted to a value of 7 or higher. In some embodiments, the pH of the film coating solution may range from about pH 7 to about pH 11. In other embodiments, the pH of the film coating solution may range from about pH 8 to about pH 10. In certain embodiments, the pH of the film coating solution may be about pH 7.5, about pH 8.0, about pH 8.5, about pH 9.0, about pH 9.5, about pH 10.0, or about pH 10.5.

Once the film coating solution is prepared, the solution is stable for at least one day. The film coating solution may be stable for longer periods of time if a preservative is included in the film coating solution.

In specific embodiments, the film coating solution comprises from about 1% to about 10% of soy protein concentrate or soy protein isolate and from about 0.01% to about 0.1% of soy lecithin by weight of the film coating solution.

(b) Film Coating Plant Seeds

In some embodiments, the biological surface may be a plant seed. The process comprises contacting a plant seed with a film coating solution as described above in section (III)(a), drying the seed after step (a) to remove the solvent, thereby forming the film coated plant seed.

Suitable plants seeds are detailed above in section (II)(b).

The film coating solution is applied to the surface of the plant seed by mixing the plant seeds with the film coating solution. In some embodiments, the film coating solution may be applied to the plant seed surface using a spraying technology. For this, a small quantity of the film coating solution is applied to the surface of the plant seed each time the seed passes through the spray zone. In other embodiments, the plant seed may be coated by transiently passing through the film coating solution via a tumbling motion. Hot air is used to evaporate the solvent (e.g., water) in the film coating solution, resulting in a buildup of dry material (i.e., film coating) on the surface of the seed. The quantity of film increases with each consecutive application of the film coating solution. Typically, a single film coating layer encompasses two to three passes through the coating system. Multiple layers of film coating comprising different active ingredients may be applied to the plant seeds.

The contacting and drying steps may be conducted in a fluidized bed system, a pan coating system, a drum coating system (e.g., tumbling drum coater, vertical drum coater, a rotary coating system, a spouted bed coating system, or a seed film coating system. The plant seeds may be coated using batch or continuous coating processes.

In general, the one or more film coatings applied to the plant seed comprise from about 1% to about 10% by weight of the plant seed. In various embodiments, the film coating(s) may comprise about 1%, about 2%, about 3%, about 4%, about 5%, about 6%, about 7%, about 8%, about 9%, or about 10% by weight of the plant seed.

(c) Film Coating Plants

In other embodiments, the biological surface may be a plant. The method comprises contacting the plant with a film coating solution comprising at least one active ingredient. For example, the active ingredient may be a fungicide or insecticide when the plant is a desirable crop plant (e.g., corn, soybean, and other plants listed above in section (II)(b)(i)) or tree (e.g., landscape trees, fruit trees, nut trees, and the like). Alternatively, the active ingredient may be a herbicide when the plant is an undesirable plant (e.g., a weed or invasive species). Non-limiting examples of fungicides, insecticides, and herbicides are presented above in section (I)(a)(iv). The plant may be a seedling, a growing plant, or a mature plant. The plant may be in a field, a garden, an orchard, a greenhouse, and the like.

The process comprises contacting the plant with the appropriate film coating solution. The contacting will generally occur via spraying means. Said spraying may be accomplished using a self-propelled sprayer, a hitch sprayer, a tractor-mounted sprayer, a skid sprayer, an aerial sprayer, a mechanical sprayer, a backpack sprayer, a hydraulic sprayer, a pneumatic sprayer, or other suitable spraying means.

In general, the drying step will occur under ambient conditions without the uses of increased air flow and/or increased temperature. Upon drying, the film coat adheres to the plant surface to prolong contact between the active ingredient and the plant and/or an infecting organism. The amount of film coating applied to the plant can and will vary.

(d) Film Coating Animals

In other embodiments, the biological surface may be an animal. The method comprises contacting the animal with a film coating solution comprising at least one active ingredient. For example, the active ingredient may be an insecticide or fungicide, examples of which are presented above in section (I)(a)(iv).

In general, the animal may be agricultural livestock such as, for example, cattle, sheep, goats, pigs, donkeys, camels, buffaloes, rabbits, chickens, turkeys, ducks, geese; other domestic animals such as, for example, horses, dogs, cats, caged birds, experimental animals such as, for example, hamsters, guinea pigs, rats and mice; and zoo animals.

In various embodiments, the method may be used to treat an animal infected with sucking lice (Anoplura), chewing lice (Mallophaga), bat bugs (Cimicidae), kissing bugs (Triatominae), mosquitoes (Culicidae), sandflies (Psychodidae), blackflies (Simuliidae), biting midges (Ceratopagonidae), horse or deer flies (Tabanidae), house flies (Muscidae), eye gnats (Chloropidae), blow flies (Calliphoridae), bot flies (Oestraidae), flesh flies (Sarcophagidae), tsetse flies (Glossinidae), louse flies ((Hippoboscidae), fleas (Siphonaptera), ticks (Ixodida, Argasida, Halarachnidae, Macronyssidae), feather mites (Analgidae, Pterolichidae), mites (Cheyletiellidae), follicle mites (Demodicidae), quill mites (Dermoglyphidae, Gaudoglyphidae), fur mites (Meyobiidae), itch mites (Psorergatidae), mange mites (Psoroptidae, Sarcoptidae), chigger mites (Trombiculidae), or other ectoparasites.

The process comprises contacting the animal with the appropriate film coating solution. The contacting step may be conducted using a sprayer or an animal dip tank. Suitable sprayers include hydraulic sprayers, pneumatic sprayers, pressure sprayers, compression sprayers, backpack sprayers, hand sprayers, bucket sprayers, rocker sprayers, stretcher sprayers, power take off sprayers, traction sprayers, mist blower and sprayers, pedal pump sprayers, and the like.

In general, the drying step will occur under ambient conditions without the uses of increased air flow and/or increased temperature. Upon drying, the film coat adheres to the surface of the animal to prolong contact between the active ingredient and the animal and/or an infecting organism. The amount of film coating applied to the animal can and will vary.

DEFINITIONS

To facilitate understanding of the invention, several terms are defined below.

The term "emergence" refers to the number of viable plants per number of seeds planted.

The term "plantability" refers to the number of seeds planted per planting opportunity. Plantability is generally measured as singulation percentage=[planting opportunities−(skips and multiples)/planting opportunities]×100. The ideal percentage for plantability is 100.

"Plant seedling vigor" encompasses seedling size, health, and growth rate.

"Seed flow" or "seed flowability" refers to the uniformity and lack of resistance to the flow of seed through a system such as a seed planter.

The term "seed dust," as used herein, refers the naturally occurring components of the seed such as chaff or outer hull or husk. The term "treated seed dust" refers to fine particulate matter contained in or easily dislodged from treated seeds. It consists of both the naturally occurring seed dust as well as components of the treatment applied to the seed.

The term "treated seeds" refers to plant seeds that are treated or coated with at least one active ingredient.

The term "yield" means the number of harvested bushels per acre of a given crop.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above-described cells and methods without departing from the scope of the invention, it is intended that all matter contained in the above description and in the examples given below, shall be interpreted as illustrative and not in a limiting sense.

EXAMPLES

The following examples illustrate various embodiments of the invention.

Example 1. Soy-Based Film Coatings

Conventional soybean seeds (i.e., comprising a seed treatment coating) were top-coated with a soy-based film coating, and their properties were compared to those of conventional soybean seed not top-coated with the soy-based film coating. For this, two solutions of the soy-based coating were prepared by heating water to about 120° F. (i.e., 49° C.) and adding a dry soy-based (SB) composition comprising soy protein isolate and soy lecithin. A one percent (1%) solution was prepared by mixing 36.85 grams of SB into 3.785 liters of heated water. A three percent (3%) solution was prepared by mixing 108.86 grams of SB in 3.785 liters of heated water. The mixtures were stirred for about one minute and a solution suspension was achieved. Some inert particles settled to the bottom of the container, but did not affect application of the film coating.

The soybeans seeds were coated with the soy-based film coatings using a routine coating process. It was observed that the 3% treated seeds spread more easily on a flat surface than the 1% treated seeds. Additionally, it was observed that the seeds coated with the soy-based film coating did not rub-off or shed coloring, a seed treatment identifier, onto the operators' hands.

Example 2. Performance Parameters

The soy-coated soybean seeds and the control soybean seeds were planted in three different test plots at different planting rates on different dates over a period of 22 days. Plant emergence was monitored at the various test plots on one or more dates after planting. The data are presented below in Table 1-3.

TABLE 1

Plot #1

|  | Control | 1% Coating | 3% Coating |
|---|---|---|---|
| 6-28 Days Post Planting |  |  |  |
| Mean Plants per 17.5' Row | 64 | 65 | 70 |
| Estimated Plants per Acre | 112,094 | 112,675 | 121,968 |
| Difference From Control |  | 0.52% | 8.81% |
| 21-43 Days Post Planting |  |  |  |
| Mean Plants per 17.5' Row | 69 | 80 | 78 |
| Estimated Plants per Acre | 120,806 | 138,811 | 135,326 |
| Difference From Control |  | 14.90% | 12.02% |

TABLE 2

Plot #2

|  | Control | 1% Coating | 3% Coating |
|---|---|---|---|
| 6-28 Days Post Planting |  |  |  |
| Mean Plants per 17.5' Row | 69 | 73 |  |
| Estimated Plants per Acre | 120,806 | 126,614 |  |
| Difference From Control |  | 4.81% |  |
| 21-43 Days Post Planting |  |  |  |
| Mean Plants per 17.5' Row | 73 | 70 |  |
| Estimated Plants per Acre | 127,776 | 131,842 |  |
| Difference From Control |  | 3.18% |  |
| 24-46 Days Post Planting |  |  |  |
| Mean Plants per 17.5' Row | 67 |  | 69 |
| Estimated Plants per Acre | 117,322 |  | 119,645 |
| Difference From Control |  |  | 1.09% |

TABLE 3

Plot #3

| 24-46 Days Post Planting | Control | 1% Coating |
|---|---|---|
| Mean Plants per 17.5' Row | 69 | 73 |
| Estimated Plants per Acre | 120,806 | 127776 |
| Difference From Control |  | 5.70% |

Figure 2:
FIG. 2 shows an image of the vegetation and root systems of a plant derived from a soy-based film coated seed (left) and control plant (right).
Figure 3:
FIG. 3 presents a photograph of the root system of a plant derived from a soy-based film coated seed in which there are an increased number of nitrogen nodules.

These data revealed that the soy-coated seeds exhibited a faster and increased rate of seedling emergence than the control seeds. Moreover, the plants derived from the soy-coated seeds had increased vigor, were taller (see FIG. 1), greener, had longer and more extensive root system (see FIG. 2 and FIG. 3), and the roots exhibited more nitrogen nodules (FIG. 3) than the control plants.

Example 3. Assessment of Seed Dust

The amount of dust released from corn and soybeans seeds coated with the soy-based film coated was compared to that released from untreated seeds and seeds coated with actives (i.e., standard insecticides), coated with actives in combination with a 3% or 5% soy solution, or coated with actives and top coated with a 5% or 10% soy solution. Solutions were prepared by mixing the actives±the soy-based coating material or the soy-based coating material in water, and the seeds were coated in a lab scale spin coater. For the conditions in which the seeds were mixed with a dry seed lubricant (i.e., talc or soy dry lubricant), seeds (800 gram) were added to a plastic bag along with the dry seed lubricant (4 ounces). The bag was manually manipulated to evenly distribute the dry seed lubricant and 100 gram samples were removed for testing.

Dust release was measured using the Heubach test according to standard protocols, except that five replicates were run for each sample rather than the standard two. The test comprised placing 100 g of each seed sample in the rotating drum of a Heubach dustmeter (Type 1), set at a 30 rpm rotation speed, and the seeds were mechanically stressed for 120 seconds. A continuous air flow of 20 L per min running through the Heubach dustmeter, provided by a vacuum pump, transported the abraded dust particles out of the rotating drum and through a connected glass cylinder and attached filter unit. The coarse non-floating particles were collected in the glass cylinder while the floating dust particles were deposited on a glass fiber filter-disc mounted inside the filter unit. The filter disc was weighed using an analytic balance prior to and after every loading cycle.

The data are presented below in Tables 4 and 5 and are expressed as grams of dust per 100,000 seeds or grams of dust per 100 kg of seeds. The thousand seed weight was determined per seed sample by weighing 100 seeds three times and extrapolating the mean weight to 1,000 seeds. The soy-based film coating reduced dust formation from both corn and soybean seeds.

TABLE 4

Dust Release from Corn Seeds

| Sample | Mean g dust per 100 g seeds | Mean g dust per 100,000 seeds | Mean g dust per 100 kg seeds ± s.d. |
|---|---|---|---|
| Bare seed | 0.00150 | 0.34236 | 1.496 ± 0.225 |
| Actives (Cruiser ® seed treatment) | 0.00006 | 0.01432 | 0.062 ± 0.055 |
| Actives + talc | 0.03683 | 8.34154 | 36.828 ± 5.192 |
| Actives + soy dry lubricant | 0.00296 | 0.63683 | 2.96 ± 0.582 |
| Actives in 3% soy solution | 0.00013 | 0.02931 | 0.130 ± 0.026 |
| Actives in 3% soy solution + talc | 0.04833 | 10.51178 | 48.330 ± 5.642 |
| Actives in 3% soy solution + soy dry lubricant | 0.00175 | 0.36575 | 1.750 ± 0.433 |
| Actives in 5% soy solution | 0.00020 | 0.04170 | 0.196 ± 0.084 |
| Actives in 5% soy solution + talc | 0.04856 | 10.47682 | 48.560 ± 5.951 |
| Actives in 5% soy solution + soy dry lubricant | 0.00178 | 0.37821 | 1.784 ± 0.492 |
| Actives + 5% soy solution overcoat | 0.00047 | 0.10061 | 0.474 ± 0.074 |

TABLE 4-continued

Dust Release from Corn Seeds

| Sample | Mean g dust per 100 g seeds | Mean g dust per 100,000 seeds | Mean g dust per 100 kg seeds ± s.d. |
|---|---|---|---|
| Actives + 5% soy solution overcoat + talc | 0.04976 | 10.97296 | 49.764 ± 23.306 |
| Actives + 5% soy solution overcoat + soy dry lubricant | 0.00191 | 0.41399 | 1.910 ± 0.302 |
| Actives + 10% soy solution overcoat | 0.00083 | 0.18385 | 0.830 ± 0.078 |
| Actives + 10% soy solution overcoat + talc | 0.05894 | 13.00698 | 59.944 ± 6.112 |
| Actives + 10% soy solution overcoat + soy dry lubricant | 0.00176 | 0.37926 | 1.764 ± 0.104 |

TABLE 5

Dust Release from Soybean Seeds

| Sample | Mean g dust per 100 g seeds | Mean g dust per 100,000 seeds | Mean g dust per 100 kg seeds ± s.d. |
|---|---|---|---|
| Bare seed | 0.00043 | 0.07736 | 0.428 ± 0.037 |
| Actives (Acceleron ® seed treatment) | 0.00012 | 0.02128 | 0.116 ± 0.077 |
| Actives + talc | 0.04363 | 7.91703 | 43.632 ± 4.454 |
| Actives + soy dry lubricant | 0.00038 | 0.07001 | 0.384 ± 0.112 |
| Actives in 3% soy solution | 0.00009 | 0.01714 | 0.092 ± 0.033 |
| Actives in 3% soy solution + talc | 0.04376 | 8.02923 | 43.756 ± 6.388 |
| Actives in 3% soy solution + soy dry lubricant | 0.00066 | 0.11916 | 0.658 ± 0.134 |
| Actives in 5% soy solution | 0.00010 | 0.01792 | 0.098 ± 0.058 |
| Actives in 5% soy solution + talc | 0.02653 | 4.85492 | 26.526 ± 9.833 |
| Actives in 5% soy solution + soy dry lubricant | 0.00061 | 0.11540 | 0.614 ± 0.104 |
| Actives + 5% soy solution overcoat | 0.00004 | 0.00575 | 0.042 ± 0.026 |
| Actives + 5% soy solution overcoat + talc | 0.04041 | 7.39430 | 40.406 ± 5.585 |
| Actives + 5% soy solution overcoat + soy dry lubricant | 0.00095 | 0.17074 | 0.950 ± 0.211 |
| Actives + 10% soy solution overcoat | 0.00003 | 0.00514 | 0.028 ± 0.023 |
| Actives + 10% soy solution overcoat + talc | 0.04416 | 8.12176 | 44.158 ± 4.401 |
| Actives + 10% soy solution overcoat + soy dry lubricant | 0.00112 | 0.20342 | 1.120 ± 0.107 |

What is claimed is:

1. A method for protecting a plant seed and reducing formation of plant seed dust, the method comprising (a) cont